(12) United States Patent
Lipman et al.

(10) Patent No.: US 9,143,894 B2
(45) Date of Patent: Sep. 22, 2015

(54) METHOD AND SYSTEM FOR PROXIMITY AND CONTEXT BASED DEDUCTION OF POSITION FOR A GPS ENABLE COMPUTING DEVICE

(75) Inventors: Justin Lipman, Shanghai (CN); Robert Colby, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 13/976,932

(22) PCT Filed: Dec. 22, 2011

(86) PCT No.: PCT/CN2011/002161
§ 371 (c)(1),
(2), (4) Date: Jun. 27, 2013

(87) PCT Pub. No.: WO2013/091145
PCT Pub. Date: Jun. 27, 2013

(65) Prior Publication Data
US 2013/0281118 A1    Oct. 24, 2013

(51) Int. Cl.
*H04W 24/00* (2009.01)
*H04M 3/00* (2006.01)
(Continued)

(52) U.S. Cl.
CPC .. *H04W 4/02* (2013.01); *G01S 5/02* (2013.01); *H04B 5/00* (2013.01); *H04W 4/023* (2013.01); *H04W 64/00* (2013.01)

(58) Field of Classification Search
CPC ......... H04W 4/02; H04W 4/043; H04W 4/12; H04W 4/023; H04W 64/00; H04W 88/12; H04W 88/02; H04W 4/021; H04W 4/022; H04W 4/25; H04W 24/00; H04W 72/082; H04Q 7/3855; H04L 29/08657; H04L 9/0872; G01C 21/3679; G01S 5/02; G01S 5/0205; G01S 5/14; G01S 5/0226; G01S 5/0263; H04B 5/00; H04B 5/02; H04B 1/38; H04B 17/00; H04M 1/00; H04M 7/00; H04M 3/00
USPC ......... 455/12.1, 13.1, 41.2–41.3, 66.1, 67.11, 455/404.2, 418–421, 427–431, 455/456.1–456.6, 550.1, 556.2, 560–561; 701/408, 412, 422, 425–426, 433–434, 701/438, 467–472, 485, 491
See application file for complete search history.

(56) References Cited

U.S. PATENT DOCUMENTS 7,769,396 B2 * 8/2010 Alizadeh-Shabdiz et al. ............ 455/456.6
8,238,937 B2 * 8/2012 Ha et al. ............ 455/456.1
(Continued)

FOREIGN PATENT DOCUMENTS

CN         1585942       2/2005
CN       101902687      12/2011
(Continued)

OTHER PUBLICATIONS
PCT/CN2011/002161 PCT International Search Report and Written Opinion, Mailing Date Sep. 27, 2012, 11 pages.
(Continued)

*Primary Examiner* — Meless Zewdu
(74) *Attorney, Agent, or Firm* — Blakely, Sokoloff, Taylor & Zafman LLP

(57) ABSTRACT

A mechanism is described for facilitating proximity and context-based deduction of global positioning of computing devices according to one embodiment of the invention. A method of embodiments of the invention includes detecting wireless proximity of a plurality of computing devices with respect to a computing device, and selecting one or more of the plurality of computing devices based on their detected proximity to the computing device. The method may further include receiving contextual information from the one or more computing devices, and semantically deducing location of the computing device based on the received contextual information.

12 Claims, 7 Drawing Sheets

(51) Int. Cl.
  *H04W 4/02* (2009.01)
  *H04B 5/00* (2006.01)
  *H04W 64/00* (2009.01)
  *G01S 5/02* (2010.01)

(56) References Cited

U.S. PATENT DOCUMENTS

| | | | |
|---|---|---|---|
| 8,456,363 B2* | 6/2013 | Konishi et al. | 342/451 |
| 8,792,910 B2* | 7/2014 | Qiu et al. | 455/404.2 |
| 8,923,887 B2* | 12/2014 | McKiou et al. | 455/456.3 |
| 2004/0098236 A1* | 5/2004 | Mayer et al. | 703/2 |
| 2004/0203904 A1* | 10/2004 | Gwon et al. | 455/456.1 |
| 2008/0139114 A1* | 6/2008 | Ranganathan | 455/41.1 |
| 2008/0242418 A1* | 10/2008 | Theimer et al. | 463/42 |
| 2009/0195447 A1* | 8/2009 | Tryding | 342/357.1 |
| 2010/0109864 A1* | 5/2010 | Haartsen et al. | 340/539.13 |
| 2010/0111033 A1 | 5/2010 | Erceg et al. | |
| 2010/0251134 A1 | 9/2010 | Van Seggelen et al. | |

FOREIGN PATENT DOCUMENTS

| | | |
|---|---|---|
| TW | 200705910 | 7/2001 |
| TW | 2011/39991 | 11/2011 |

OTHER PUBLICATIONS

Search Report pf R.O.C. Patent Application No. 101144709, Issued Jun. 3, 2014, Mailed Jul. 25, 2014.

* cited by examiner

METHOD AND SYSTEM FOR PROXIMITY AND CONTEXT BASED DEDUCTION OF POSITION FOR A GPS ENABLE COMPUTING DEVICE

CROSS-REFERENCE TO RELATED APPLICATION

This patent application is a U.S. National Phase Application under 35 U.S.C. §371 of International Application No. PCT/CN2011/002161, filed Dec. 22, 2011, entitled MECHANISM FOR EMPLOYING AND FACILITATING PROXIMITY AND CONTEXT-BASED DEDUCTION OF GLOBAL POSITIONING OF COMPUTING DEVICES.

FIELD

The field relates generally to computing devices and, more particularly, to employing a mechanism for employing and facilitating proximity and context-based deduction of global positioning of computing devices.

BACKGROUND

Existing indoor Location-Based Services (LBS) techniques for mobile devices are limited in accuracy in that they rely upon information obtained from various wireless access points (APs) or based on pre-composed maps and AP locations, etc. These conventional techniques are not only inaccurate, but also expensive because they rely upon employing costly traditional server-side LBS that are required to be tied to specific vendors.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for facilitating proximity and context-based deduction of global positioning of computing devices according to one embodiment of the invention. A method of embodiments of the invention includes detecting wireless proximity of a plurality of computing devices with respect to a computing device, and selecting one or more of the plurality of computing devices based on their detected proximity to the computing device. The method may further include receiving contextual information from the one or more computing devices, and semantically deducing location of the computing device based on the received contextual information.

In one embodiment, Wi-Fi proximity detection is used to selectively acquire context information (e.g., varying distances) from nearby computing devices (e.g., peer computing devices, access points, printers, beacons, etc.), which is then used to semantically infer or deduce a current location of a computing device (e.g., a client computing device, such as a smartphone, a tablet computer, a laptop, etc.). This inferred semantic location can be used independently or with other forms of Location-Based Services (LBS). In one embodiment, using Wi-Fi proximity detection enables inferred location of a client computing device with respect to various locations and distances associated with any number of peer computing devices (see FIG. 4) and within an environment (see FIG. 3) to be determined with greater specificity and accuracy than the conventional LBS. For example, obtaining contextual information using proximity detection is more accurate, efficient, and far superior to simply acquiring contexts from computing devices within a broadcast range (e.g., Bluetooth).

In one embodiment, with regard to the Wi-Fi proximity detection, Wi-Fi signals may be used to measure proximity between two or more computing devices (e.g., notebooks or laptops, personal computers, mobile computing devices, handheld devices, smart phones, GPS-based navigation systems, etc.). For example and in one embodiment, Wi-Fi antennae employed at each computing device are used to provide signal strength differentiation between, for example, left and right antenna of a computer to provide a measurement of proximity. This technique uses strategic placement of two or more antennae on each computing device to provide a multiple measurements of proximity, which improves detection of proximity and determination of direction and aspect (e.g., left, right, front, back, etc.) of computing devices relative to each other. In another embodiment, Wi-Fi access point beacons are used to perform tight time synchronization between various computing devices, which can be used for audio-based co-localization. In yet another embodiment, adaptive clocking is used to measure local interferences (associated with nearby computing devices) and these interferences are then used as signals for measuring proximity.

Figure 1:
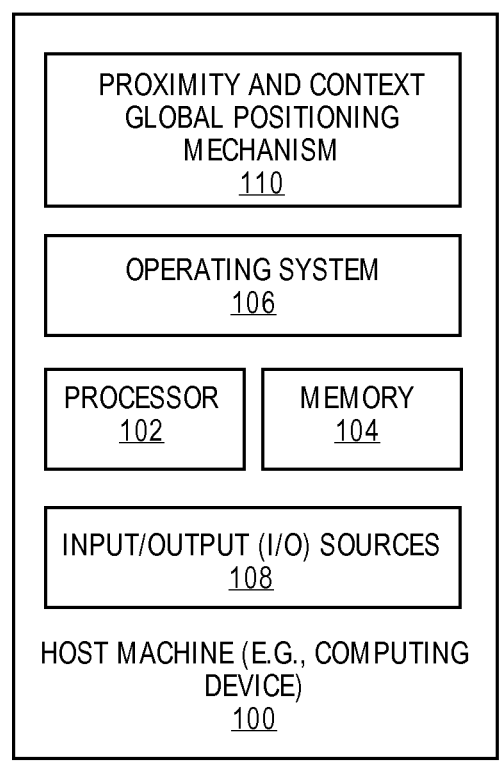
FIG. 1 illustrates a computing device employing a proximity and context-based global positioning mechanism according to one embodiment of the invention.

FIG. 1 illustrates a computing device employing a proximity and context-based global positioning mechanism according to one embodiment of the invention. In one embodiment, a host machine (e.g., computing device) 100 is illustrated as having a proximity and context-based global positioning mechanism ("proximity/context-based mechanism") 110 to facilitate dynamic and automatic determination of global positioning of computing devices based on their Wi-Fi proximity detection and relevant contextual information. Computing device 100 may include mobile computing devices, such as cellular phones including smartphones (e.g., IPhone®, BlackBerry®, etc.), handheld computing devices, personal digital assistants (PDAs), etc., tablet computers (e.g., IPad®, Samsung® Galaxy Tab®, etc.), laptop computers (e.g., notebooks, netbooks, etc.), e-readers (e.g., Kindle®, Nook®, etc.), GPS-based navigation systems, etc. Computing device 100 may further include set-top boxes (e.g., Internet-based cable television set-top boxes, etc.), and larger computing devices, such as desktop computers, server computers, cluster-based computers, etc.

Computing device 100 includes an operating system 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "memory client", "host", "server", "memory server", "machine", "device", "computing device", "server device", "client device", "computer", "computing system", "cluster based computer", and the like, are used interchangeably and synonymously throughout this document.

Figure 2:
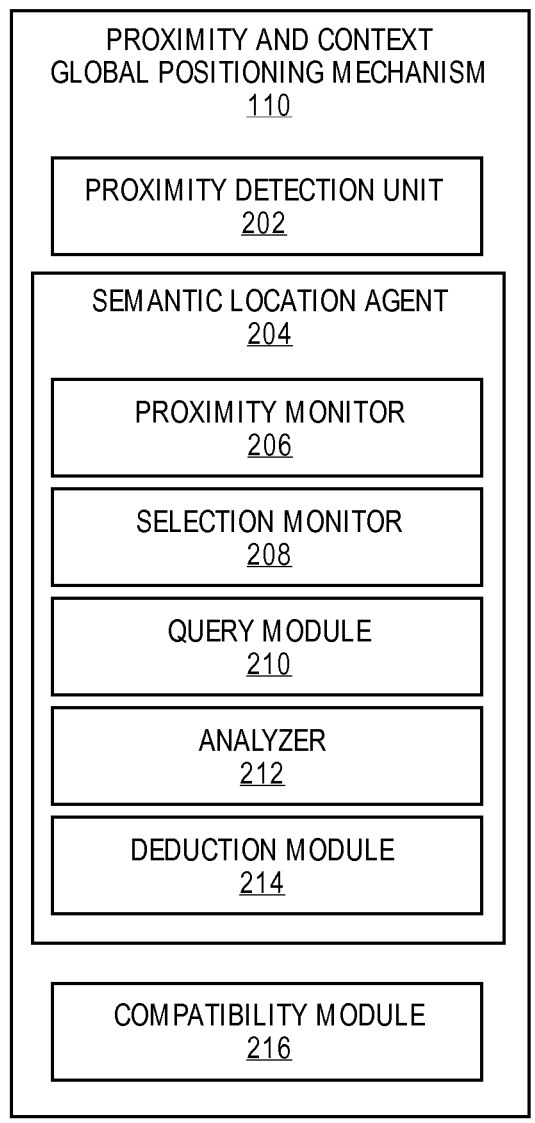
FIG. 2 illustrates a proximity and context-based global positioning mechanism according to one embodiment of the invention.

FIG. 2 illustrates a proximity and context-based global positioning mechanism according to one embodiment of the invention. In the illustrated embodiment, the proximity/context-based mechanism 110 includes various components 202, 204, 206, 208, 210, 212, 214 and 216 to facilitate dynamic and automatic determination of locations or positions of computing devices based on their Wi-Fi proximity detection and relevant contextual information. In one embodiment, the proximity/context-based mechanism 110 includes a proximity detection unit 202 to facilitate Wi-Fi-based proximity detection of computing devices to provide differing levels of proximity between two or more computing devices based, for example, on "touching" (such as when two or more computing devices are within 20 centimeters of each other), "closeness" (such as when two or more computing devices are within 3 meters (but more than 20 centimeters) of each other), "nearby" (such as when two or more computing devices are within 5 meters (but more than 3 meters) of each other), "in-range" (such as when two or more computing devices are greater than 5 meters of each other but, for example, within a predetermined proximity area or range), and the like. It is contemplated that these distances and areas are used as examples and can changed or be re-defined as frequently as necessitated or desired. Further, audio-based proximity can be used to provide additional proximity detection for computing devices when they are, for example, in the "same room" or within the same "environment" experiencing the same cross-correlated noise levels.

In one embodiment, the aforementioned Wi-Fi-based detection of proximity of computing devices is performed by a proximity detection unit 202 by determining signal strength of one or more signals being communicated between antennae of one or more computing devices. Using the strength of these signals that are associated with a broadcast packet, proximity (e.g., physical placement) of one computing device with respect to the another computing device is determined. The determined signal strength may be based on Received Signal Strength Indicator (RSSI) between an antenna of a first computing device and an antenna of a second computing device. The proximity detection unit 202 may further detect an embedded time within a Wi-Fi signal that is communicated between a wireless access point and, for example, the first computing device and furthermore, communicate an audio signal between the first computing device and the second computing device, and determine a reception time of the audio signal. The proximity detection unit 202 may determine the proximity of the first and second computing devices based on the reception time and the speed of sound. The proximity detection unit 202 may determine Wi-Fi interferences caused by unit, such as a backlight (e.g., Liquid Crystal Display (LCD)), and then determine the proximity of the first computing device with respect to the second computing device based on the determined interferences.

In one embodiment, the proximity/context-based mechanism 110 includes a semantic location agent 204 having a proximity monitor 206 to monitor proximity of computing devices (as determined by the aforementioned proximity detection unit 202) to determine computing devices (e.g., roaming computing devices, such as smartphones, tablet computers, etc.) or wireless access points, etc., that are within defined levels of wireless proximity with respect to each other or a particular computing device (e.g., a client computing device, such as a smartphone, a tablet computer, belonging to a user). For example, if a user having a client computing device is seeking to find a coffee shop, a number of computing devices (beaconing out their locations and/or updates relative to their locations), any number of wireless access points, and the like, within a defined area or range around the coffee shop are detected by the proximity detection unit 202 and monitored by the proximity monitor 206.

Upon monitoring the computing devices and/or access points and their locations within the defined area, in one embodiment, any one or more (including all) of the computing devices and/or access points can be selected by a selection module 208 so they can be queried for contextual information by a query module 210. In one embodiment, these computing devices and/or access points may automatically and voluntarily provide contextual information to a query module 210 upon being selected by the selection module 208, while, in another embodiment, these computing devices and/or access points may be probed by the query module 210 for such information upon knowing of their selection by the selection module 208. For example, the query module 210 may query the selected computing devices and/or access points to obtain from them certain contextual information about the computing devices and/or access points (e.g., roaming or stationary, physical location, building or street name, floor or office number, etc.) and/or their users (e.g., interests, personal life, work life, health information, etc.).

This contextual information may then be formed into a context tree, by the query module 210, for each computing device and/or access point as will be further illustrated with reference to FIG. 3. These context trees are then provided to an analyzer 212 for further analysis. The analyzer 212 reviews and analyzes the received context trees and any other relevant information (e.g., any relevant or helpful information received through inputs by users, such as having coffee at the Starbucks® near Main St. and Ocean Ave. as published on a social network website, such as Facebook®, Twitter®, etc., which can be used to find the current location of the computing device posting the message and other computing devices near that particular Starbucks). In one embodiment, this context tree can be shared by all participating or peer computing devices to their current location as well as their destinations without having to access the Internet or be part of any wireless infrastructure. In one embodiment, each computing device or access point can broadcast its context tree and receive context trees associated with other participating or peer computing devices and access trees. In one embodiment, a deduction module 214 semantically processes the context trees received from other computing devices and APs to deduce or infer its own geographic or physical position and the proximity to other locations, such as the user's desired destination (e.g., a house, an airport, a mall, a coffee shop, a street, a post office, a ballpark, a school, etc.). This semantic process may include studying various words, symbols, signs, phrases, etc., contained within contextual information as provided by the context trees. The geographic location of computing devices and APs may be provided with respect to their longitude (e.g., 8 hex characters+1 byte), latitude (e.g., 8 hex characters+1 byte), and the like.

The proximity/context-based mechanism 110 further includes a compatibility module 216 that allows the proximity/context-based mechanism 110 to be dynamically and automatically compatible with any type of computing devices (e.g., a Wi-Fi-enabled computing device, such as a personal computer, a tablet computer, a smartphone, a video game console, a digital audio player, a GPS-based navigation system, etc.), Wi-Fi or hotspot service providers (e.g., telecommunication companies, Internet service providers, etc.), current and future rules and standards (e.g., Institute of Electrical and Electronics Engineers (IEEE) 802.11, etc.), and the like.

It is contemplated that any number and type of components may be added to and removed from the proximity/context-based mechanism 110 to facilitate dynamic and automatic client-side triangulation for detecting geo locations or positions of computing devices. For brevity, clarity, ease of understanding and to stay focused on the proximity/context-based mechanism 110, many of the standard or known components, such as those of a computing device, are not shown or discussed here. It is contemplated that embodiments of the invention are not limited to any particular technology or standard and is dynamic enough to adopt the changing technology and standards.

Figure 3:
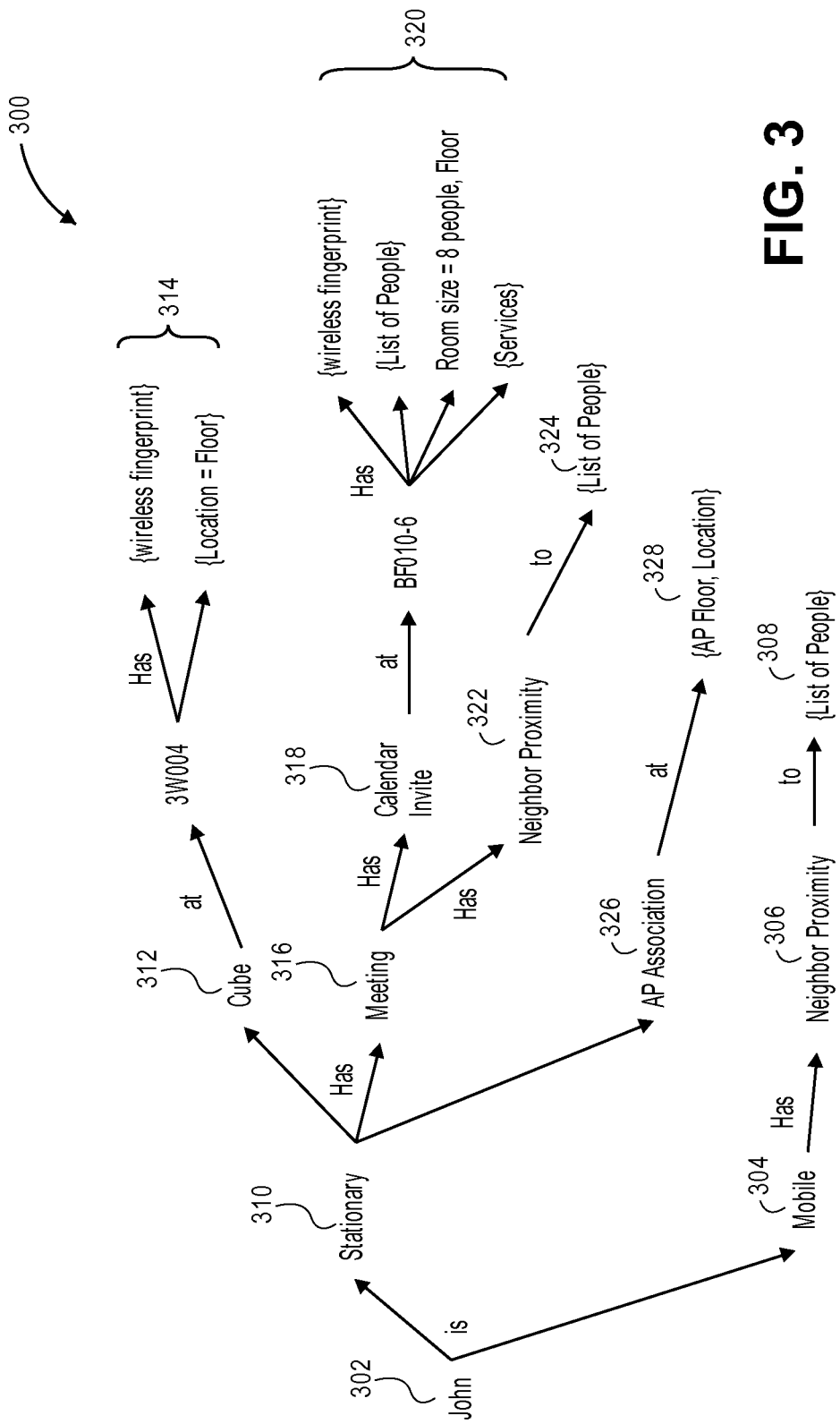
FIG. 3 illustrates a context tree associated a computing device according to one embodiment of the invention.

FIG. 3 illustrates a context tree associated a computing device according to one embodiment of the invention. In one embodiment, a computing device 302, referenced here by its user name, John, may be detected within a defined area for wireless proximity. In the illustrated embodiment, the context tree 300 provides relevant contextual information, such as when the computing device 302 is moving or roaming, it is regarded as a mobile device 304 having neighbor proximity 306 to any number of computing devices or access points as referenced by their users, such as a list of people 308.

When the computing device 302 is stationary, such as when in a cube 312 at the office, in a meeting 316 somewhere, or having an association with a static wireless access point 326. As with when mobile 304, the context tree 300 provides relevant contextual information relating to each of the stationary positions 312, 316, 326, such as if in the cube 312 at work, it provides the cube's physical location (e.g., 3W004) and other relevant information 314, such as its wireless fingerprint or physical location, such as the building's floor number where the cube 312 is located (and thus, the computing device 302).

Similarly, in case of the user/computing device 302 being in a meeting 316, the computing device 302 may have a calendar invite 318 that indicates its physical location (e.g., conference room 8F010-8) and other relevant information (e.g., wireless fingerprint, list of people, room size, floor number, other services, and the like). The meeting option 316 may also be used to reveal the computing device's 302 neighborhood proximity 322 and a list of people 324 associated with it. The computing device's 302 access point association 326 may be used to reveal the AP's physical location 328, such as the room number, floor, building address, etc., and which can reveal the proximity of the computing device 302 with reference to other computing devices, APs, and other physical locations and/or destinations.

Figure 4:
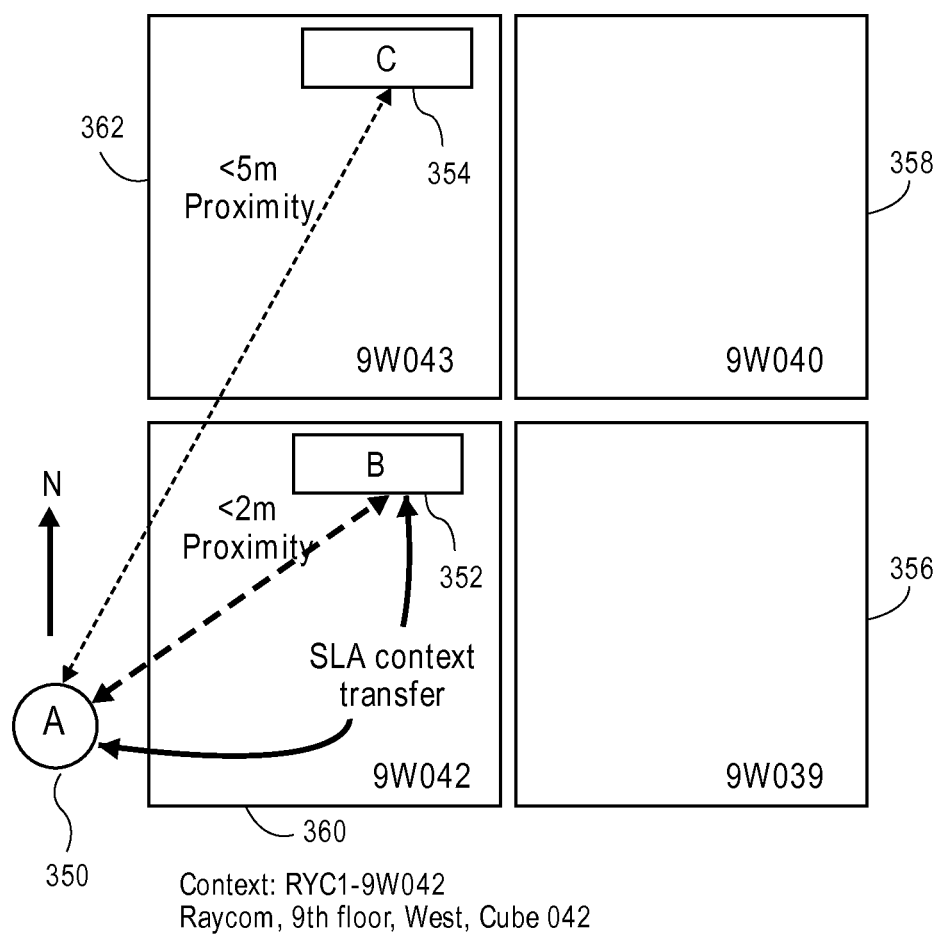
FIG. 4 illustrates a transaction sequence based on peer proximity of and context-exchange with static computing devices using a proximity and context-based global positioning mechanism according to one embodiment of the invention.

FIG. 4 illustrates a transaction sequence based on peer proximity of and contextual information exchange with static computing devices using a proximity and context-based global positioning mechanism according to one embodiment of the invention. In the illustrated embodiment and continuing with our previous example, computing device A 350 is heading north (such as its user seeks to find a bookstore). In one embodiment, using the proximity/context-based mechanism 110 of FIG. 1, proximities of two nearby stationary computing devices (or static access points) B 352 and C 354 in relation to computing device A 350 are determined. As illustrated, two computing devices B 352 and C 354 are found in two offices 360 and 362, respectively, of an office building. These static or fixed computing devices B 352 and C 354 may be mobile devices but regarded as static here because they are found to be stationary, such as forgotten on an office desk or left there because their users are busy attending a meeting or working in their respective offices 360, 362, or the like. The other two offices 356, 358 are shown as either not having any computing devices or access points or being out of the defined range or area of proximity. In one embodiment, a proximity range or area may be defined by users of any number of participating computing devices, such as computing device A 350, pre-defined by service providers, limited or restricted by system capabilities or participation of any of the access points or computing devices 350, 352, 354, or the like. For example, the user of computing device A 350 defines the acceptable proximity range and feeds that information to the proximity/context-based mechanism 110 of FIG. 1 via his or her computing device A 350.

In the illustrated embodiment, computing device B 352 having a distance of less than 2 meters may be considered "close" to computing device A 350, while computing device C 354 having a distance of less than 5 meters (but more than 2 meters) from computing device A 350 is regarded as "nearby". Given that computing device B 352 is closer to computing A 350, certain contextual information (e.g., in the form of context trees) is exchanged between computing devices A 350 and B 352. Any relevant information obtained from computing device B's 352 context tree may be then be used by computing device A 350 to know and be confident about its own physical location with respect to its destination (e.g., the bookstore).

Figure 5:
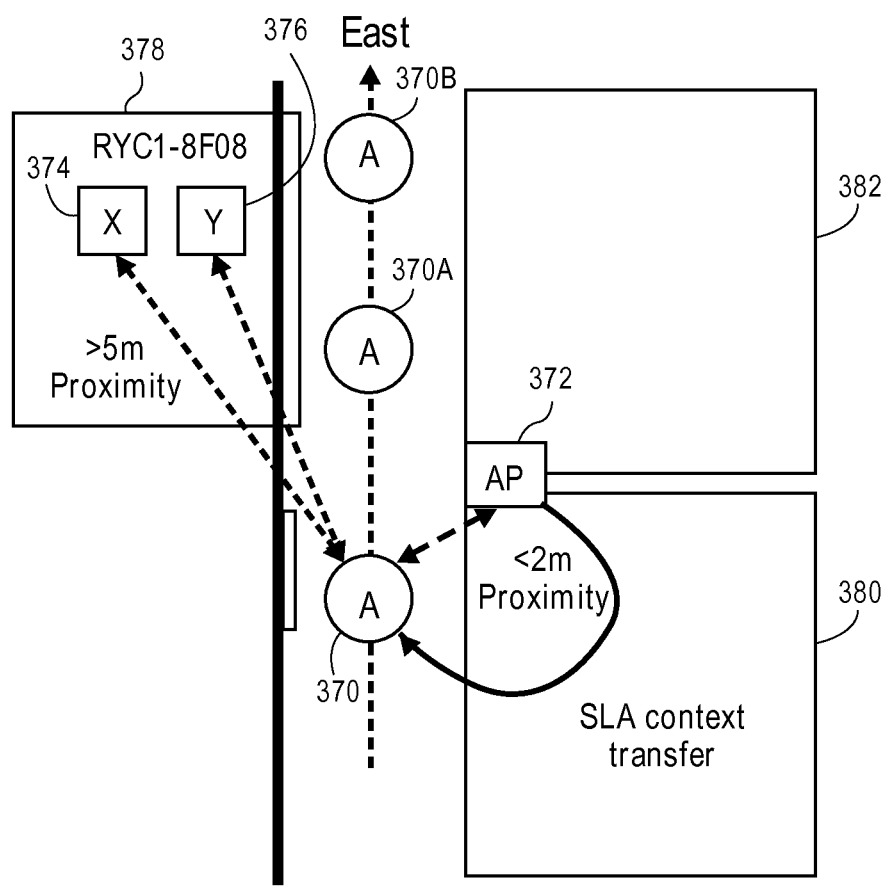
FIG. 5 illustrates a transaction sequence based on peer proximity of and context-exchange with an access point and roaming computing devices using a proximity and context-based global positioning mechanism according to one embodiment of the invention.

FIG. 5 illustrates a transaction sequence based on peer proximity of and contextual information exchange with an access point and roaming computing devices using a proximity and context-based global positioning mechanism according to one embodiment of the invention. For brevity and clarity, certain details of FIG. 4 are not repeated here; however, as with FIG. 4 and continuing with the same example, here, computing device A 370 is moving or roaming East to get to its destination (e.g., the bookstore) and in the process, comes across a static wireless access point 372 and a couple of roaming computing devices X 374 and Y 376. Here, the two roaming computing devices X 374, Y 376 are regarded as "nearby" for having a distance of more than 2 meters and less than 5 meters from computing device A 370, while the access point 372 is regarded as "close" for having a relatively smaller distance of less than 2 meters from computing device A 370. According, using the proximity/context-based mechanism 110 of FIG. 1, context trees are exchanged between the access point 372 and computing device A 370 to help (the user of) computing device A 370 reach the desired destination. As illustrated, the wireless AP 372 is found or located between two structures 380, 382 (e.g., buildings, rooms, floors, cubes, homes, etc.).

Figure 6:
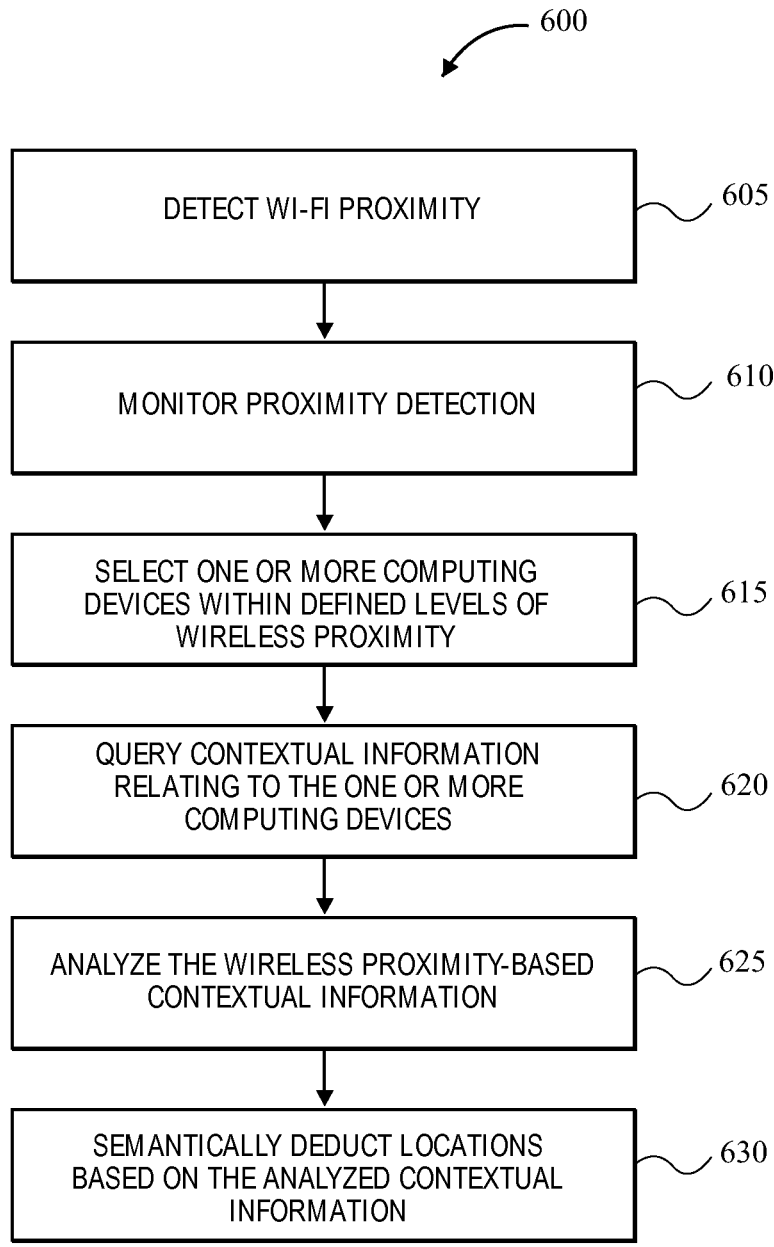
FIG. 6 illustrates a method for semantically deducing geographic locations of computing devices based on proximity detection and contextual information according to one embodiment of the invention.

FIG. 6 illustrates a method for semantically deducing geographic locations of computing devices based on proximity detection and contextual information according to one embodiment of the invention. Method 600 may be performed by processing logic that may comprise hardware (e.g., circuitry, dedicated logic, programmable logic, etc.), software (such as instructions run on a processing device), or a combination thereof. In one embodiment, method 600 may be performed by the proximity and context-based global positioning mechanism 110 of FIG. 1

Figure 7:
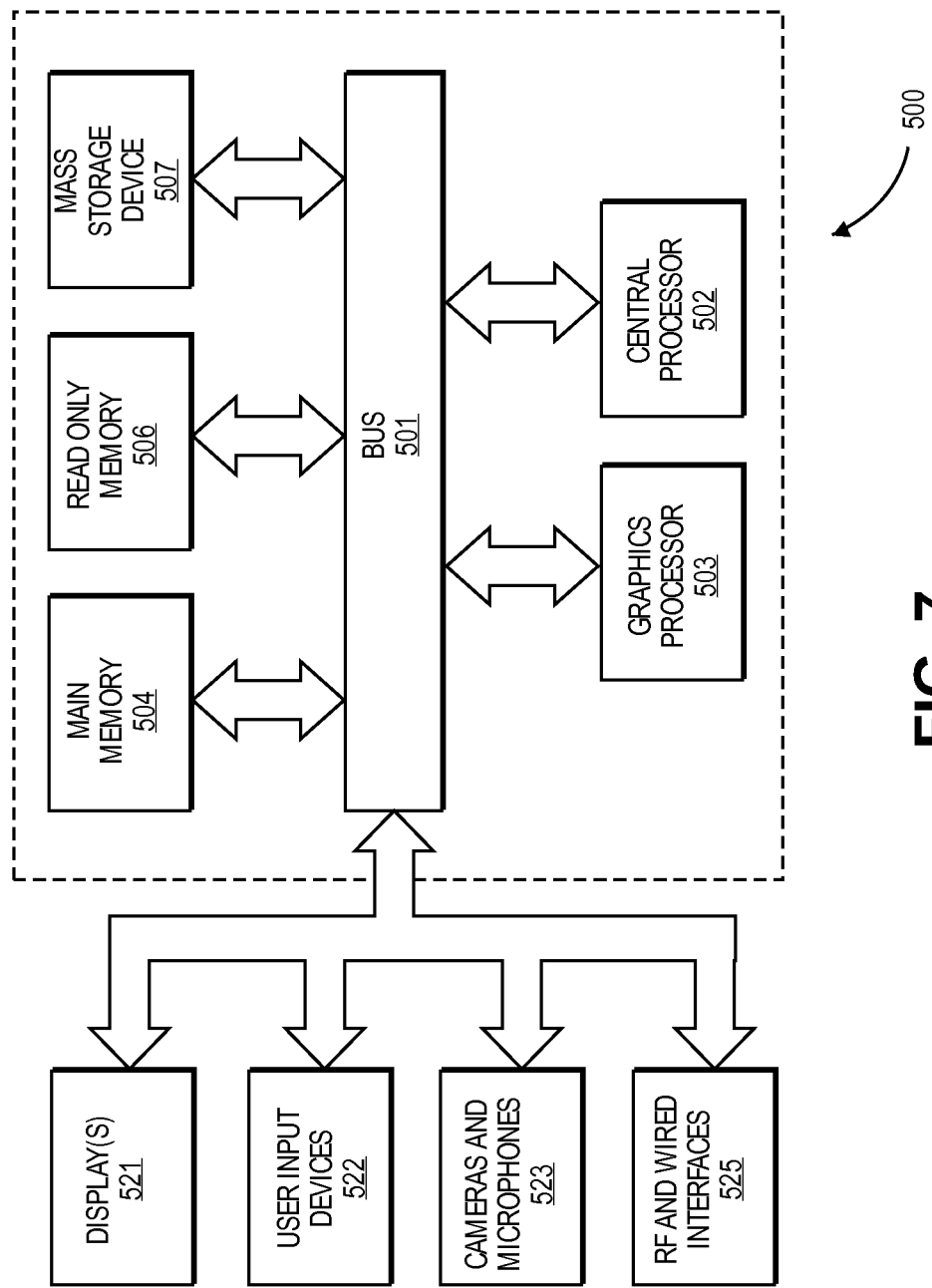
FIG. 7 illustrates a computing system according to one embodiment of the invention.

Method 600 begins at block 605 with determining Wi-Fi-based proximities of roaming or static computing devices and/or wireless access points within a defined wireless proximity area. At block 610, the detected computing devices and/or access points are monitored. At block 615, one or more (including all) of the detected computing devices and/or access points within the defined levels or area of wireless proximity are selected. At block 620, the selected computing devices and/or access points are queried or probed for relevant contextual information that is then used to form a context tree for each of the selected computing devices and/or access points. In one embodiment, these context trees may then be exchanged between any number of computing devices and/or access points. At block 625, one or more relevant context trees are analyzed and, at block 630, processed to semantically deduce locations of these computing devices and/or access points FIG. 7 illustrates a computing system 500 employing and facilitating a proximity and context-based global positioning mechanism according to one embodiment of the invention. The exemplary computing system 500 may be the same as or similar to the computing device 100 FIG. 1 and any of the other computing devices discussed throughout this document, such as with reference to FIGS. 3-5. The computer system 500 includes a bus a link or an interconnect (hereinafter referred to as "bus") or other communication means 501 for communicating information, and processing means such as a microprocessor 502 coupled with the bus 501 for processing information. The computer system 500 may be augmented with a graphics processor 503 for rendering graphics through parallel pipelines and may be incorporated into one or more central processor(s) 502 or provided as one or more separate processors.

The computer system 500 further includes a main memory 504, such as a RAM or other dynamic data storage device, coupled to the bus 501 for storing information and instructions to be executed by the processor 502. The main memory also may be used for storing temporary variables or other intermediate information during execution of instructions by the processor. The computer system 500 may also include a nonvolatile memory 506, such as a Read-Only Memory (ROM) or other static data storage device coupled to the bus 501 for storing static information and instructions for the processor.

A mass memory 507 such as a magnetic disk, optical disc, or solid state array and its corresponding drive may also be coupled to the bus 501 of the computer system 500 for storing information and instructions. The computer system 500 can also be coupled via the bus to a display device or monitor 521, such as a Liquid Crystal Display (LCD) or Organic Light Emitting Diode (OLED) array, for displaying information to a user. For example, graphical and textual indications of installation status, operations status and other information may be presented to the user on the display device 521, in addition to the various views and user interactions discussed above.

Typically, user input devices 522, such as a keyboard with alphanumeric, function and other keys, etc., may be coupled to the bus 501 for communicating information and command selections to the processor 502. Additional user input devices 522 may include a cursor control input device such as a mouse, a trackball, a trackpad, or cursor direction keys can be coupled to the bus for communicating direction information and command selections to the processor 502 and to control cursor movement on the display 521.

Camera and microphone arrays 523 may be coupled to the bus 501 to observe gestures, record audio and video and to receive visual and audio commands as mentioned above.

Communications interfaces 525 are also coupled to the bus 501. The communication interfaces may include a modem, a network interface card, or other well-known interface devices, such as those used for coupling to Ethernet, token ring, or other types of physical wired or wireless attachments for purposes of providing a communication link to support a LAN or Wide Area Network (WAN), for example. In this manner, the computer system 500 may also be coupled to a number of peripheral devices, other clients, or control surfaces or consoles, or servers via a conventional network infrastructure, including an Intranet or the Internet, for example. Examples of a network include, but are not limited to, a LAN, a WAN, a Metropolitan Area Network (MAN), a Personal Area Network (PAN), an intranet, the Internet, and the like.

In one embodiment, at least one computer-readable media having instructions stored thereon which, if executed by a computer, cause the computer to detect wireless proximity of a plurality of computing devices with respect to the first computing device, select one or more of the plurality of computing devices based on their detected proximity to the first computing device, receive contextual information from the one or more computing devices, and semantically deduce location of the first computing devices based on the received contextual information. The execution of the instructions may further cause the computer to monitor the detection of wireless proximity of the plurality of computing devices, and probe the selected one or more computing devices when the one or more computing devices are detected within a proximity range of the first computing device. The execution of the instructions may further cause the computer to analyze the detected proximity and the received contextual information to classify the one or more computing devices as one or more of touching the first computing device, close to the first computing device, nearby the first computing device, and in-range of the first computing device.

Embodiments may be implemented as any or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware, such as firmware.

Embodiments may be provided, for example, as a computer program product which may include one or more machine-readable media, such as a non-transitory machine-readable medium, having stored thereon machine-executable instructions that, when executed by one or more machines such as a computer, such as computing system 500, network of computers, or other electronic devices, may result in the one or more machines carrying out operations in accordance with embodiments of the present invention. A machine-readable medium may include, but is not limited to, floppy diskettes, optical disks, Compact Disc-ROMs (CD-ROMs), and magneto-optical disks, ROMs, RAMs, Erasable Programmable Read-Only Memories (EPROMs), EEPROMs Electrically Erasable Programmable Read-Only Memories (EEPROMs), magnetic or optical cards, flash memory, or other type of media/machine-readable medium suitable for storing machine-executable instructions, such as solid state storage devices, fast and reliable DRAM sub-systems, etc.

Program code, or instructions, may be stored in, for example, volatile and/or non-volatile memory, such as storage devices and/or an associated machine-readable or machine-accessible or machine-executable medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine-readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, smartphones, tablet computers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. Embodiments of the invention are not limited by these specific examples. Numerous variations, whether explicitly given in the specification or not, such as differences in structure, dimension, and use of material, are possible. Embodiments may be at least as broad as given by the following claims.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto consistent with the description herein. The Specification and drawings are, accordingly, to be regarded in an illustrative rather than a restrictive sense.

What is claimed is:

1. An apparatus comprising:

proximity detection unit to detect wireless proximities associated with of a plurality of computing devices with respect to a computing device, wherein the detecting includes measuring, via adaptive clocking, local interferences associated with the plurality of computing devices, wherein the local interferences are used as signals for detecting the wireless proximities;

proximity monitor to monitor the proximity detection based on the detected wireless proximities, wherein the monitoring includes selecting one or more computing devices of the plurality of computing devices within defined levels of one or more of the detected wireless proximities associated with the one or more of the computing devices;

query module to query contextual information relating to the one or more computing devices, wherein the contextual information includes data including at least one or more of physical locations, roaming positions, stationary positions, one or more users of the one or more computing device, and interests or life modes relating to the one or more users;

analyzer to analyze the one or more detected wireless proximities based on the contextual information; and deduction module to semantically deduce one or more locations of the one or more computing devices based on the analyzed contextual information.

2. The apparatus of claim 1, wherein the the proximity monitor is further to probe the selected one or more computing devices when the one or more computing devices are detected proximity ranges of the computing device, wherein the proximity ranges are based on differing proximity levels including one or more of a touching level, a closeness level, a nearby level, and an in-range level.

3. The apparatus of claim 2, wherein the proximity detection unit is further to measure the proximity range based on signal strength communicated between two or more computing devices of the plurality devices via communication antennae strategically placed at each of the plurality of computing devices.

4. The apparatus of claim 2, wherein the analyzer is further to analyze the proximity ranges and the contextual information to classify the one or more computing devices as one or more of touching the computing device within the touching level, close to the computing device within the closeness level, nearby the computing device within the nearby level, and in-range of the computing device within the in-range level.

5. A method comprising:

detecting wireless proximities associated with a plurality of computing devices with respect to a computing device, wherein the detecting includes measuring, via adaptive clocking, local interferences associated with the plurality of computing devices, wherein the local interferences are used as signals for detecting the wireless proximities;

monitoring proximity detection based on the detected wireless proximities, wherein the monitoring includes selecting one or more computing devices of the plurality of computing devices within defined levels of one or more of the detected wireless proximities associated with the one or more computing devices;

querying contextual information relating to the one or more computing devices, wherein the contextual information includes data including at least one or more of physical locations, roaming positions, stationary positions, one or more users of the one or more computing device, and interests or life modes relating to the one or more users;

analyzing the one or more detected wireless proximities based on the contextual information; and semantically deducing one or more locations of the one or more computing devices based on the analyzed contextual information.

6. The method of claim 5, further comprising probing the selected one or more computing devices when the one or more computing devices are detected within a proximity range of the computing device, wherein the proximity ranges are based on differing proximity levels including one or more of a touching level, a closeness level, a nearby level, and an in-range level.

7. The method of claim 6, further comprising measuring the proximity range based on signal strengths communicated between two or more computing devices of the plurality devices via communication antennae strategically placed at each of the plurality of computing devices.

8. The method of claim 6, further comprising analyzing the proximity range and the contextual information to classify the one or more computing devices as one or more of touching the computing device within the touching level, close to the computing device within the closeness level, nearby the computing device within the nearby level, and in-range of the computing device within the in-range level.

9. At least one non-transitory machine-readable medium comprising a plurality of instructions that in response to being executed on a computing device, causes the computing device to carry out one or more operations comprising:

detecting wireless proximities associated with a plurality of computing devices with respect to a computing device, wherein the detecting includes measuring, via adaptive clocking, local interferences associated with the plurality of computing devices, wherein the local interferences are used as signals for detecting the wireless proximities;

monitoring proximity detection based on the detected wireless proximities, wherein the monitoring includes selecting one or more computing devices of the plurality of computing devices within defined levels of one or more of the detected wireless proximities associated with the one or more computing devices;

querying contextual information relating to the one or more computing devices, wherein the contextual information includes data including at least one or more of physical locations, roaming positions, stationary positions, one or more users of the one or more computing device, and interests or life modes relating to the one or more users;

analyzing the one or more detected wireless proximities based on the contextual information; and semantically deducing one or more locations of the one or more computing devices based on the analyzed contextual information.

10. The machine-readable medium of claim 9, wherein the one or more operations further comprise probing the selected one or more computing devices when the one or more computing devices are detected within a proximity range of the computing device, wherein the proximity ranges are based on differing proximity levels including one or more of a touching level, a closeness level, a nearby level, and an in-range level.

11. The machine-readable medium of claim 10, wherein the one or more operations further comprise measuring the proximity range based on signal strengths communicated between two or more computing devices of the plurality devices via communication antennae strategically placed at each of the plurality of computing devices.

12. The machine-readable medium of claim 10, wherein the one or more operations further comprise analyzing the proximity range and the contextual information to classify the one or more computing devices as one or more of touching the computing device within the touching level, close to the computing device within the closeness level, nearby the computing device within the nearby level, and in-range of the computing device within the in-range level.

* * * * *